US011835216B2

(12) United States Patent
Heib et al.

(10) Patent No.: US 11,835,216 B2
(45) Date of Patent: Dec. 5, 2023

(54) LIGHTING MODULE FOR FLUID DELIVERY APPARATUS AND FLUID DELIVERY APPARATUS

(71) Applicant: MOTHERSON INNOVATIONS COMPANY LIMITED, London (GB)

(72) Inventors: Sascha Björn Heib, Lonsdale (AU); Simon David Field, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 570 days.

(21) Appl. No.: 17/065,792

(22) Filed: Oct. 8, 2020

(65) Prior Publication Data

US 2021/0095844 A1  Apr. 1, 2021

Related U.S. Application Data

(63) Continuation-in-part of application No. PCT/EP2019/059537, filed on Apr. 12, 2019.
(Continued)

(51) Int. Cl.
*F21V 33/00* (2006.01)
*F21V 7/28* (2018.01)
(Continued)

(52) U.S. Cl.
CPC ............ *F21V 33/004* (2013.01); *A47K 3/281* (2013.01); *A47K 7/00* (2013.01); *B05B 1/18* (2013.01);
(Continued)

(58) Field of Classification Search
CPC .. A47K 3/281; B05B 1/18; E03C 1/04; F16K 37/0025; F21V 23/006; H05B 45/20
See application file for complete search history.

(56) References Cited

U.S. PATENT DOCUMENTS 5,265,959 A * 11/1993 Meltzer ................. G01K 11/12
374/E11.018
6,375,342 B1 * 4/2002 Koren ................... B05B 17/085
239/18
(Continued)

FOREIGN PATENT DOCUMENTS

EP      2937478 A1   10/2015
EP      3165631 A1    5/2017
(Continued)

OTHER PUBLICATIONS

International Search Report dated Jul. 25, 2019 of International application No. PCT/EP2019/059537.
(Continued)

Primary Examiner — Zheng Song
(74) Attorney, Agent, or Firm — Jones Day

(57) ABSTRACT

A fluid delivery apparatus lighting module includes a first portion having a polymeric substrate having a chromium or chromium-based reflective coating coated on at least an outer surface of the polymeric substrate, the polymeric substrate and chromium or chromium-based reflective coating being at least partially permeable to light; at least one light source disposed within the fluid delivery apparatus lighting module, wherein the at least one light source is configured to receive power from at least one power source and emit light through at least the polymeric substrate and chromium or chromium-based reflective coating of the first portion, and wherein the at least one light source, when emitting no light in an unlit condition, is concealed within the fluid delivery apparatus lighting module behind at least the polymeric substrate and chromium or chromium-based reflective coating of the first portion; at least one sensor selected from the group consisting of a wired fluid temperature sensor, a wireless fluid temperature sensor, a wired fluid flow sensor, a wireless fluid flow sensor, a mechanical fluid (Continued)

flow sensor, a mechanical sensor, a wired motion sensor, a wireless motion sensor, and combinations thereof.

15 Claims, 11 Drawing Sheets

Related U.S. Application Data

(60) Provisional application No. 62/656,369, filed on Apr. 12, 2018.

(51) Int. Cl.
*H05B 45/20* (2020.01)
*A47K 3/28* (2006.01)
*B05B 1/18* (2006.01)
*E03C 1/04* (2006.01)
*F21V 23/00* (2015.01)
*A47K 7/00* (2006.01)

(52) U.S. Cl.
CPC .................. *E03C 1/04* (2013.01); *F21V 7/28* (2018.02); *F21V 23/006* (2013.01); *H05B 45/20* (2020.01)

(56) References Cited

U.S. PATENT DOCUMENTS

| | | | | |
|---|---|---|---|---|
| 6,393,192 | B1 * | 5/2002 | Koren | G02B 6/0008 239/18 |
| 2004/0258567 | A1 * | 12/2004 | Kokin | F21V 33/004 422/68.1 |
| 2005/0276035 | A1 * | 12/2005 | Currie | F21V 33/004 362/96 |
| 2006/0045167 | A1 * | 3/2006 | Pawlenko | G01K 13/02 374/E1.019 |
| 2006/0118645 | A1 * | 6/2006 | An | F21V 33/004 236/94 |
| 2008/0271795 | A1 * | 11/2008 | Buhlmann | E03C 1/0404 137/551 |
| 2013/0146160 | A1 | 6/2013 | Davidson et al. | |

FOREIGN PATENT DOCUMENTS

JP 2014-043728 A 3/2014
WO WO 2003/106772 A1 12/2003

OTHER PUBLICATIONS

Written Opinion dated Jul. 25, 2019 of International application No. PCT/EP2019/059537.

* cited by examiner

LIGHTING MODULE FOR FLUID DELIVERY APPARATUS AND FLUID DELIVERY APPARATUS

CROSS-REFERENCE TO RELATED APPLICATIONS

The present application is a continuation-in-part of International Patent Application No. PCT/EP2019/059537, filed Apr. 12, 2019, which claims the benefit of priority to U.S. Provisional Patent Application No. 62/656,369, filed Apr. 12, 2018, each of which is hereby incorporated by reference in its entirety for all purposes.

TECHNICAL FIELD

The present disclosure relates generally to fluid delivery apparatus and, more particularly, to integrated lighting of a fluid delivery apparatus. In particular the invention refers to a fluid delivery apparatus lighting module and a fluid delivery apparatus comprising such a lighting module.

BACKGROUND

A wide variety of fluid delivery apparatus are commonly used in both residential and commercial environments to selectively dispense or deliver flow of various kinds of fluids. Such fluid delivery apparatus may include at least one coating coated thereon for decorative purposes or a variety of other purposes. Furthermore, such fluid delivery apparatus may include integrated lighting for a variety of purposes.

For example, various styles of taps, otherwise commonly known as faucets, may include a reflective coating coated thereon exhibiting a chrome or mirror-like surface finish, and may also include integrated lighting. In the case where a tap includes integrated lighting, at least one light source is often placed on or around an external surface of the tap, thus remaining visible whether the at least one light source is actively emitting light or not. Such an integrated lighting configuration in a tap, or any other fluid delivery apparatus, poses several disadvantages and challenges. Externally-visible light sources, which may appear cluttered as being visible even when not emitting light, may actually worsen or hamper aesthetic appeal, especially considering many manufactures, such as for taps and the like, are aiming to offer more modern, sleek and simple designs to consumers. Furthermore, external surfaces of the light sources or other external light-emitting elements reflecting light from the light sources may become damaged and/or wear over time. Additionally, as a result of design and/or aesthetic considerations, there are limitations to how many light sources may be placed on, in or around an external surface of a tap or any other fluid delivery apparatus, thus limiting the amount of possible lighting design elements or functional lighting features which could potentially be provided by integrated lighting.

With the aforementioned disadvantages, challenges and limitations in mind, there is a continuing unaddressed need to provide various fluid delivery apparatus, particularly those having a reflective coating coated thereon, with integrated lighting capable of being hidden or concealed when not emitting light, capable of being protected from potential external damage and/or wear and capable of increasing the amount of possible lighting design elements or functional lighting features that may be provided on the fluid delivery apparatus. Therefore, the object of the invention is to provide a lighting module for a fluid delivery apparatus complying with said need.

SUMMARY

At least the above-identified need is met with the present disclosure. That is, the object is achieved by a lighting module for a fluid delivery apparatus of claim 1. Preferred embodiments of the lighting module of the invention are described in sub-claims 2 to 11. Further, the invention provides a fluid delivery apparatus in line with claim 12, with preferred embodiments being described in claims 13 and 14.

According to one aspect of the present disclosure, which is directed to a lighting module for a fluid delivery apparatus, the lighting module includes a first portion including a polymeric substrate having a chromium or chromium-based reflective coating coated on at least an outer surface of the polymeric substrate. The polymeric substrate and chromium or chromium-based reflective coating are at least partially permeable to light. Additionally, the lighting module further includes at least one light source disposed within the lighting module. The at least one light source is configured to receive power from at least one power source and emit light through at least the polymeric substrate and chromium or chromium-based reflective coating of the first portion. The at least one light source, when emitting no light in an unlit condition, is concealed within the lighting module behind at least the polymeric substrate and chromium or chromium-based reflective coating of the first portion.

Another aspect of the present disclosure is directed to a lighting module for a fluid delivery apparatus. The lighting module includes an enclosure which includes at least a first portion and a second portion. The first portion of the enclosure includes a polymeric substrate having a chromium or chromium-based reflective coating coated on at least an outer surface of the polymeric substrate. The polymeric substrate and chromium or chromium-based reflective coating are at least partially permeable to light. Additionally, the lighting module further includes a printed circuit board assembly (PCBA) disposed within the enclosure. The PCBA is connected to at least one light source. The PCBA is configured to receive power from at least one power source. Additionally, the lighting module further includes at least one sensor in communication with the PCBA for communicating sensed information to the PCBA. The at least one light source is configured to emit light based on at least the PCBA receiving the sensed information from the at least one sensor. Additionally, the lighting module further includes a mask disposed within the enclosure. The mask includes at least one opaque portion which is configured to be impermeable to the light emitted by the at least one light source and further includes at least one non-opaque portion which is configured to be permeable to the light emitted by the at least one light source. Additionally, the lighting module further includes at least one lens disposed within the enclosure between the mask and the at least one light source. The at least one lens is configured to receive the light emitted by the at least one light source and homogeneously distribute the received light through the at least one non-opaque portion of the mask and through the polymeric substrate and chromium or chromium-based reflective coating of the first portion of the enclosure.

According to a further aspect of the present disclosure, which is also directed to a fluid delivery apparatus capable of selectively carrying or dispensing a flow of fluid, the fluid delivery apparatus comprises a lighting module according to the disclosure.

Another aspect of the present disclosure is directed to a fluid delivery apparatus, which comprises a water tap comprising a lighting module of the disclosure. According to a first embodiment the first portion of the lighting module is generally curved in at least one section thereof and is part of at least a spout assembly of the water tap, wherein the at least one light source of the lighting module is environmentally sealed within the spout assembly of the water tap. According to a second embodiment the first portion of the lighting module is generally planar in at least one section thereof and is part of at least a spout assembly of the water tap, and the at least one light source of the lighting module is environmentally sealed within the spout assembly of the water tap.

Another aspect of the present disclosure is directed to a fluid delivery apparatus, which comprises a shower panel comprising a lighting module of the disclosure, wherein the first portion of the lighting module is generally planar in at least one section thereof and is part of at least a front generally planar portion of the shower panel, and wherein the at least one light source of the lighting module is environmentally sealed within the shower panel.

Another aspect of the present disclosure is directed to a fluid delivery apparatus, which comprises a shower control valve system comprising a lighting module of the disclosure, wherein the first portion of the lighting module is generally planar in at least one section thereof and is part of at least a front portion of an escutcheon of the shower control valve system, and wherein the at least one light source of the lighting module is environmentally sealed within the shower control valve system.

Another aspect of the present disclosure is directed to a fluid delivery apparatus, which comprises a shower head comprising a lighting module of the disclosure, wherein the first portion of the lighting module is part of at least a first portion of the shower head, the first portion of the shower head having at least an exterior surface, wherein the at least one light source of the lighting module is environmentally sealed within the shower head, and wherein the shower head is a fixed shower head or a handheld shower head.

Another aspect of the present disclosure is directed to a fluid delivery apparatus, which comprises a fluid nozzle comprising a lighting module of the disclosure, wherein the first portion of the lighting module is part of at least a first portion of the fluid nozzle, the first portion of the fluid nozzle having at least an exterior surface, and wherein the at least one light source of the lighting module is environmentally sealed within the fluid nozzle.

Another aspect of the present disclosure is directed to a fluid delivery apparatus, which comprises a thermostatic valve comprising a lighting module of the disclosure, wherein the first portion of the lighting module is part of at least a first portion of the thermostatic valve, the first portion of the thermostatic valve having at least an exterior surface, and wherein the at least one light source of the lighting module is environmentally sealed within the thermostatic valve.

BRIEF DESCRIPTION OF THE DRAWINGS

One or more exemplary embodiments of the present disclosure are pointed out with particularity in the appended claims. However, other features of the one or more embodiments will become more apparent and will be best understood by referring to the following detailed description in conjunction with the accompanying drawings, wherein:

DETAILED DESCRIPTION

As required, one or more detailed embodiments of the present disclosure are disclosed herein, however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Additionally, various terms and/or phrases describing or indicating a position or directional reference such as "top", "bottom", "front", "rear", "forward", "rearward", "end", "outer", "inner", "left", "right", etc. may relate to one or more particular components as seen generally from a user's vantage point during use or operation, and such terms and/or phrases are not to be interpreted as limiting, but merely as a representative basis for describing the disclosure to one skilled in the art.

Figure 1:
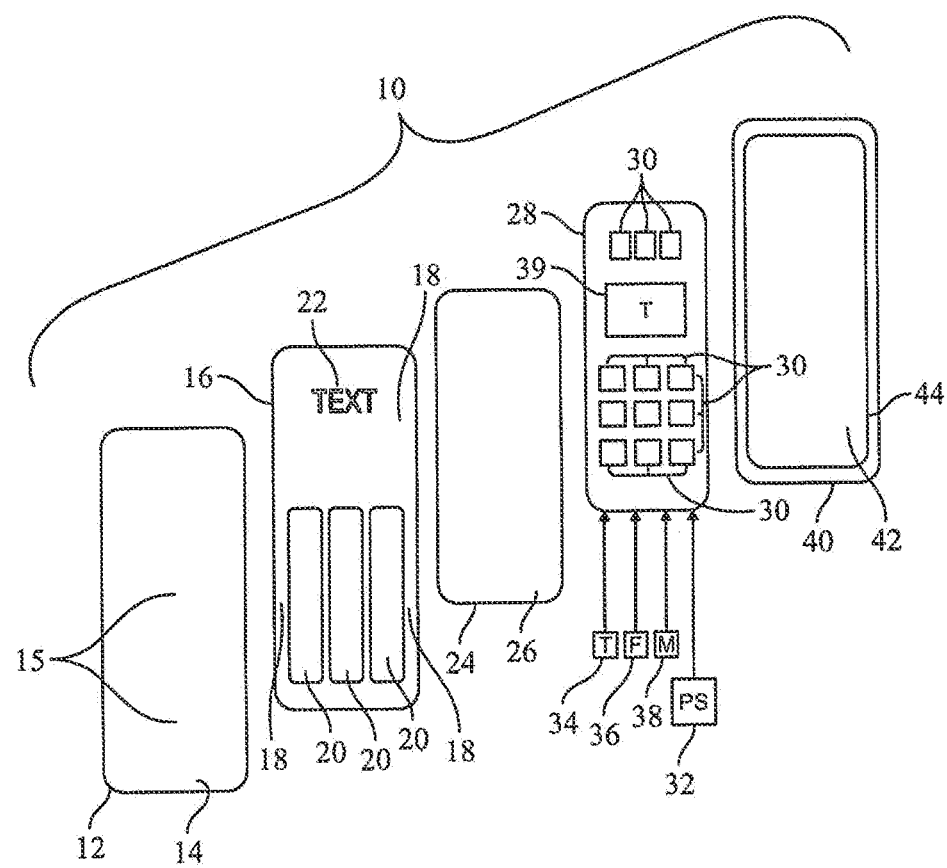
FIG. 1 is an exploded view of a schematic diagram depicting an exemplary lighting module for a fluid delivery apparatus.
Figure 2A:
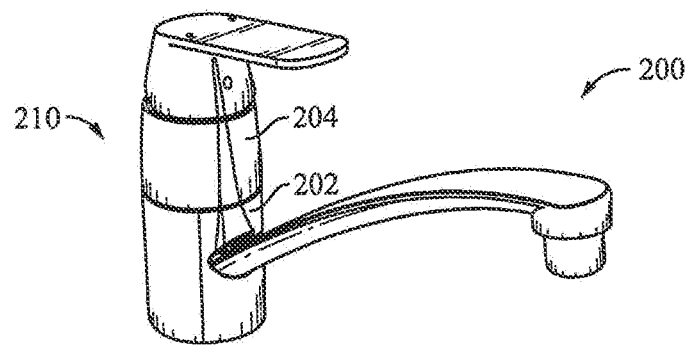
FIGS. 2A, 2B, and 2C are perspective views of an exemplary water tap including one exemplary embodiment of a lighting module which may function in an unlit condition (FIG. 2A) or in various lit conditions (FIGS. 2B-2C)
Figure 2B:
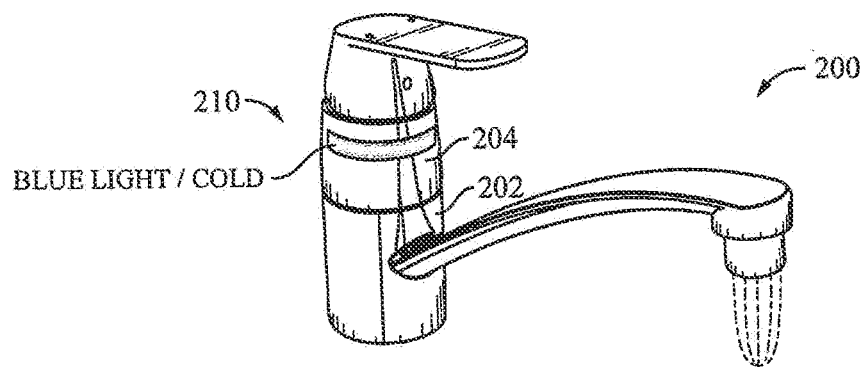
Figure 2C:
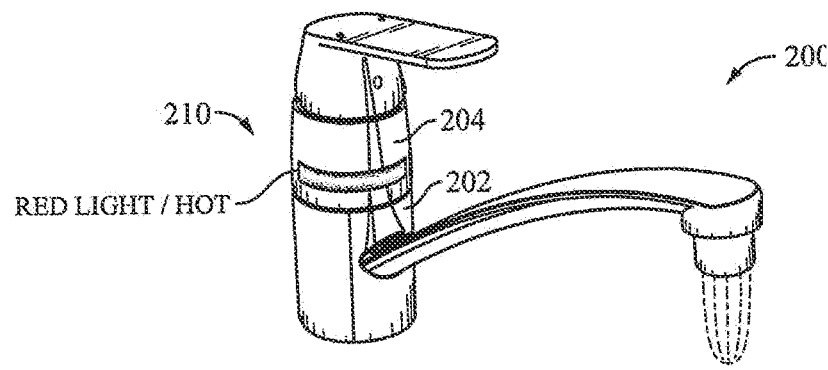
Figure 3A:
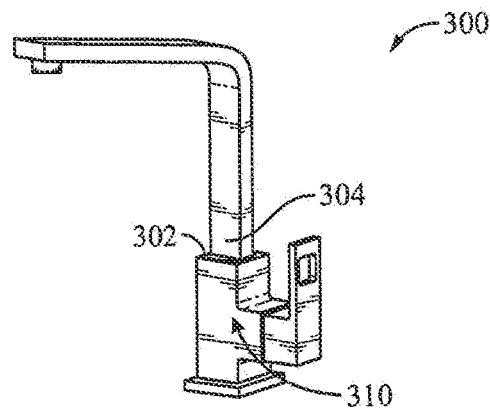
FIGS. 3A, 3B, and 3C are perspective views of another exemplary water tap including another exemplary embodiment of a lighting module which may function in an unlit condition (FIG. 3A) or in various lit conditions (FIGS. 3B-3C)
Figure 3B:
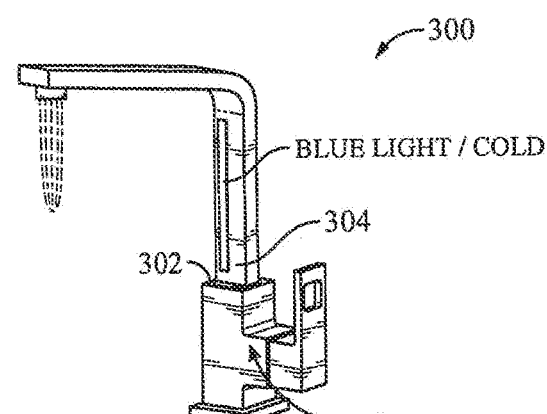
Figure 3C:
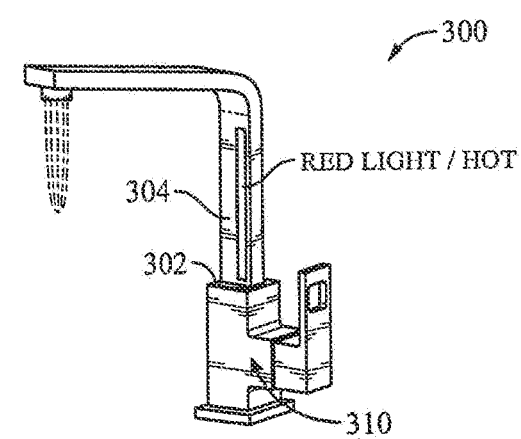
Figure 4:
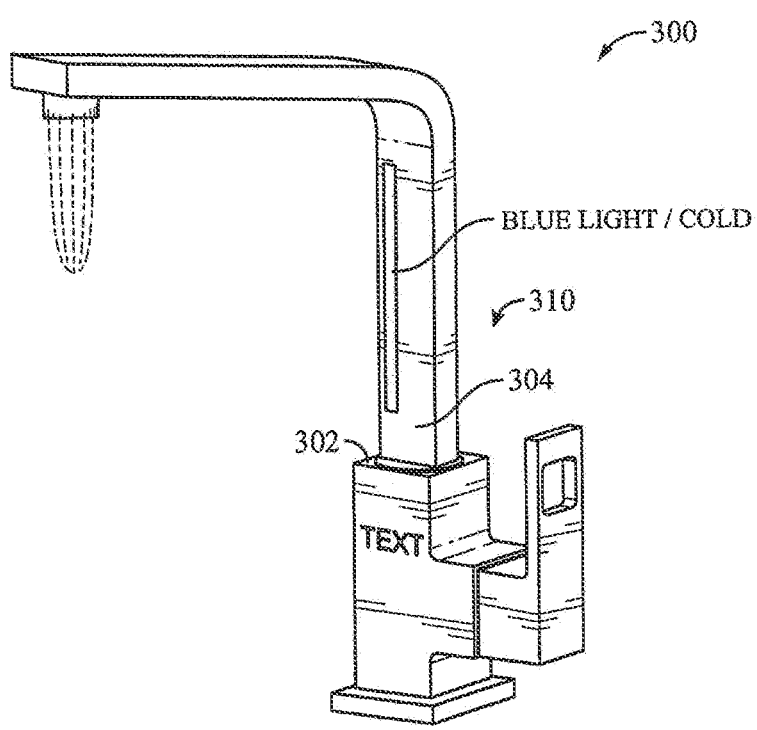
FIG. 4 is a perspective view of the water tap shown in FIGS. 3A-3C, depicting the lighting module in a lit condition in which various text, shapes or other images may be further displayed.

Referring to FIG. 1, an exploded view of a schematic diagram depicting an exemplary lighting module 10 for a fluid delivery apparatus is shown. As will be further described herein, the lighting module 10 may be assembled or integrated with, or may be formed as part of, various fluid delivery apparatus of different shapes and/or sizes. The lighting module 10 includes an enclosure which includes at least a first portion 12 and a second portion 40. The enclosure may be formed from at least the first and second portions 12, 40 being joined, or spatially arranged relative to one another, and may be configured as a partial enclosure being partially enclosed or a full enclosure being fully enclosed. In either case, various components (as will be further described herein) of the lighting module 10 may be disposed and/or secured within the enclosure between the first and second portions 12, 40, so as to be environmentally sealed within the enclosure to be protected from outside environmental elements when the lighting module 10 is assembled or integrated with, or formed as part of, a fluid delivery apparatus. Such outside environmental elements may include, for example, water, moisture, steam, oil, dirt, dust, soil, sand, soap, chemicals, pests, insects and the like. The first and second portions 12, 40 (which are merely schematically shown in FIG. 1) of the enclosure of the lighting module 10 may be of various shapes and/or sizes depending on a shape and/or size of a fluid delivery apparatus which includes the lighting module 10. As non-limiting examples, the first and second portions 12, 40 may include sections which are generally curved and/or generally planar. As another non-limiting example, the first and second portions 12, 40 may both be circular such that the second portion 40 is concentrically disposed within the first portion 12 (e.g. configured to surround a fluid pipe or conduit of a fluid delivery apparatus). The first portion 12 of the enclosure of the lighting module 10 includes a polymeric substrate 14 having a chromium or chromium-based reflective coating 15 coated on at least an outer surface of the polymeric substrate 14. As a non-limiting example, the first portion 12, and thus the polymeric substrate 14 thereof, may be formed by a manufacturing process such as injection molding and/or thermoforming, although any suitable manufacturing process may be employed. As will be further described herein, the polymeric substrate 14 and chromium or chromium-based reflective coating 15 are at least partially permeable to light. The second portion 40 may include at least one opaque material impermeable to light and may be formed by a manufacturing process such as casting, stamping, injection molding and/or thermoforming, although any suitable manufacturing process may be employed. Optionally, as with the first portion 12, the second portion 40 of the enclosure of the lighting module 10 may include a polymeric substrate having a chromium or chromium-based reflective coating coated on at least an outer surface of the polymeric substrate, which may be at least partially permeable to light.

The polymeric substrate 14 and chromium or chromium-based reflective coating 15 of at least the first portion 12 of the enclosure of the lighting module 10 will now be described. A polymeric substrate having a chromium or chromium-based reflective coating coated thereon which is at least partially permeable to light is disclosed in U.S. Pat. Nos. 9,656,601 B2; 9,181,616 B2; 9,176,256 B2; 9,819,343 B2, and United States Patent Application Publication Number US 2017/0267179 A1, each of which is hereby incorporated by reference in its entirety for all purposes. As a non-limiting example, the polymeric substrate 14 is formed from a material selected from the group consisting of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends thereof. Alternatively, as a non-limiting example, the polymeric substrate 14 is formed from a material selected from the group consisting of polycarbonate, poly(2,2'-dihydroxyphenylpropane) carbonate, polydiethyleneglycol bis(allyl carbonate), polymethylmethacrylate, polystyrene and blends thereof. Furthermore, as non-limiting examples, the polymeric substrate 14 includes a pre-coated film in the form of a hardcoat, a silicon hardcoat, an inorganic oxide, a thin metal film, or a combination of these pre-coated films. As such, the chromium or chromium-based reflective coating 15 is able to be coated on the pre-coated film included on the polymeric substrate 14.

In an example, the reflective coating 15 is chromium or it may be chromium-based. A chromium-based coating includes an alloy of chromium and a dopant material. The dopant material is selected from a group of hexagonally close-packed transition metals. As non-limiting examples, the group of hexagonally close-packed transition metals includes at least one of zirconium, titanium, cobalt, hafnium, rubidium, yttrium and osmium. Alternatively, as a non-limiting example, the group of hexagonally close-packed transition metals includes at least one of zirconium, titanium and cobalt. The alloy has a crystal structure of a primary body-centered cubic phase in coexistence with a secondary omega hexagonally close-packed phase. The alloy is a binary alloy of the chromium and the dopant material. An atomic percentage of the dopant material in the binary alloy may range from about 1.9 at. % to about 5.8 at. %. For example, the dopant material may be zirconium, and an atomic percentage of the zirconium in the binary alloy may range from about 4.5 at. % to about 5.8 at. %. Alternatively, the dopant material may be titanium, and an atomic percentage of the titanium in the binary alloy may range from about 1.9 at. % to about 5.8 at. %. Alternatively, the dopant material may be cobalt, and an atomic percentage of the cobalt in the binary alloy may range from about 1.9 at. % to 5.7 at. %. As a non-limiting example, the chromium-based reflective coating 15 has a thickness of 200 nm or less, such as 200 nm, 100 nm, from 40 nm to 80 nm, from 50 nm to 70 nm, or about 60 nm.

Furthermore, the chromium or chromium-based reflective coating 15 is configured to be at least partially permeable to light such that about 6% to about 21% of the light emitted thereto (e.g. by at least one light source which will be later described herein) is permitted to pass therethrough. As such, depending on the desired brightness and/or intensity of the light which is to pass through at least the chromium or chromium-based reflective coating 15 (i.e. via passing through the polymeric substrate 14), light sources (e.g. at least one light source which will be later described herein) which have sufficient light output (i.e. in lumens) may ideally be selected and employed, as may be understood by one of ordinary skill. Additionally, it is to be understood that it is highly ideal and advantageous that the chromium or chromium-based reflective coating 15 be coated on at least the outer surface of the polymeric substrate 14 of the first portion 12 (e.g. the outermost surface of the polymeric substrate 14 which is physically touchable by a person, disposed opposite the inner surface of the polymeric substrate 14). In other words, the chromium or chromium-based reflective coating 15 being coated on an alternative surface, such as on the inner surface of the polymeric substrate 14, may not be capable of producing, at an acceptable or desirable level, a decorative chrome or mirror-like surface finish which provides sufficient surface protection and/or aesthetic appeal for the lighting module 10, and thus ultimately for a fluid delivery apparatus which includes the lighting module 10.

As schematically shown in FIG. 1, a printed circuit board assembly (PCBA) 28 is disposed and/or secured within the enclosure between the first and second portions 12, 40, such as within a space or mounting area 42. As non-limiting examples, fastening elements such as clips, screws, rivets, adhesives or the like (not shown) may be employed to secure the PCBA 28 within the enclosure of the lighting module 10, as may be understood by one of ordinary skill. Optionally, more than one PCBA 28 may be disposed and/or secured within the enclosure between the first and second portions 12, 40. The PCBA 28 may be of various shapes and/or sizes depending on a shape and/or size of a fluid delivery apparatus which includes the lighting module 10. As non-limiting examples, the PCBA 28 may include sections which are generally curved and/or generally planar. As another non-limiting example, the PCBA 28 may be circular (e.g. configured to surround at least a fluid pipe or conduit of a fluid delivery apparatus). The PCBA 28 is electrically-connected to at least one light source 30 (as further described herein). The at least one light source 30 may be integrated into the PCBA 28 as part of the PCBA 28 or may be separate from the PCBA 28 and electrically-connected to the PCBA 28 by at least one electrical connector, wire or the like (not shown). It may be appreciated that the at least one light source 30, when emitting no light in an unlit condition, is advantageously concealed within the lighting module 10 behind at least the polymeric substrate 14 and chromium or chromium-based reflective coating 15 of the first portion 12. The PCBA 28 is configured to receive power from at least one power source 32, such that the at least one power source 32 provides power to the PCBA 28 and to the at least one light source 30. As a non-limiting example, the at least one power source 32 is selected from the group consisting of a wired power source, a wireless power source (e.g. Cota® Radio Frequency (RF) based power transmission by Ossia, Inc.), at least one battery (e.g. at least one rechargeable or disposable battery), a fluid-driven electric power generator (i.e. power being generated by fluid flowing through a fluid delivery apparatus) and combinations thereof. The at least one power source 32 may be included as part of the lighting module 10 or may be separate from the lighting module 10 and not included as part of the lighting module 10. At least one sensor 34, 36, 38 is in communication with the PCBA 28 for communicating sensed information to the PCBA 28. As a non-limiting example, the at least one sensor 34, 36, 38 in communication with the PCBA 28 is selected from the group consisting of a wired or wireless fluid temperature sensor 34, a wired, wireless or mechanical fluid flow sensor 36, a wired or wireless motion sensor 38, a mechanical sensor (not shown) and combinations thereof. The at least one sensor 34, 36, 38 may be included as part of the lighting module 10 or may be separate from the lighting module 10 and not included as part of the lighting module 10. The at least one light source 30 is configured to emit light based on at least the PCBA 28 receiving the sensed information from the at least one sensor 34, 36, 38 (as will be further described herein).

As further schematically shown in FIG. 1, a mask 16 is disposed within the enclosure of the lighting module 10. Optionally, more than one mask 16 may be disposed within the enclosure of the lighting module 10. The mask 16 includes at least one opaque portion 18, which is configured to be impermeable to the light emitted by the at least one light source 30, and further includes at least one non-opaque portion 20, 22 which is configured to be permeable to the light emitted by the at least one light source 30. The at least one non-opaque portion 20, 22 of the mask 16 may include a plurality of non-opaque portions 20, 22, such as two or more non-opaque portions 20, 22. The at least one non-opaque portion 20, 22 of the mask 16 may further include at least one opening, such as a plurality of openings, which may include two or more openings, cut out of or otherwise formed in the mask 16, and configured to be permeable to the light emitted by the at least one light source 30. The at least one non-opaque portion 20, 22 of the mask 16 may be shaped to correspond to a shape of at least one image such that when the light from the at least one light source 30 is emitted through the at least one non-opaque portion 20, 22 of the mask 16, the shape of the at least one image projects through at least the polymeric substrate 14 and chromium or chromium-based reflective coating 15 of the first portion 12 and may be seen as lit from outside of the lighting module 10. As non-limiting examples, the at least one image is selected from the group consisting of logos, lines, letters, numbers, shapes, a rectangle, a square, a triangle, a trapezoid, a parallelogram, a pentagon, a hexagon, a heptagon, an octagon, a nonagon, a decagon, a circle, an oval, an arc, a cross, a tree, a water drop, a snowflake, a flame, a heatwave, a thermometer, a star, a lightning bolt and combinations thereof. The mask 16 is disposed on or near at least an inner surface of the polymeric substrate 14 of the first portion 12. As non-limiting examples, the mask 16 is formed from at least one layer of opaque material or a combination of opaque and non-opaque materials, such as a polymeric and/or metallic materials, and may be secured to the inner surface of the polymeric substrate 14 of the first portion 12 by way of one or more fastening elements such as clips, screws, rivets, adhesives or the like (not shown), as may be understood by one of ordinary skill. Alternatively, the mask 16 may be formed directly on the inner surface of the polymeric substrate 14 of the first portion 12 by way of a manufacturing process such as injection molding, overmolding and/or thermoforming, although any suitable manufacturing process may be employed.

As further schematically shown in FIG. 1, at least one lens 24 is disposed and/or secured within the enclosure of the lighting module 10 between the mask 16 and the at least one light source 30. For example, the at least one lens 24 may be mounted to projections (not shown) extending from the PCBA 28 or to support members (not shown) formed within and as part of the enclosure of the lighting module 10. As non-limiting examples, fastening elements such as clips, screws, rivets, adhesives or the like (not shown) may be employed to secure the at least one lens 24 within the enclosure of the lighting module 10, as may be understood by one of ordinary skill. The at least one lens 24 is transparent, includes at least one lens surface 26 and is configured to receive the light emitted by the at least one light source 30 and homogeneously distribute the received light through the at least one non-opaque portion 20, 22 of the mask 16 and through the polymeric substrate 14 and chromium or chromium-based reflective coating 15 of the first portion 12 of the enclosure. It may be appreciated that the at least one lens 24 being configured to provide such a homogenous distribution of light may further provide the capability to mix, enhance, improve, smoothen and/or soften the aesthetic appearance of the light emitted through the at least one non-opaque portion 20, 22 of the mask 16 and through the polymeric substrate 14 and chromium or chromium-based reflective coating 15 of the first portion 12 of the enclosure. As a non-limiting example, the at least one lens 24 is formed from a material selected from the group consisting of polyacrylate, polyester, polystyrene, polyethylene, polypropylene, polyamides, polyimides, polycarbonate, epoxy, phenolic, acrylonitrile-butadiene-styrene, acrylonitrile-styrene-acrylates, acetal and blends thereof. Alternatively, as a non-limiting example, the at least one lens 24 is formed from a material selected from the group consisting of polycarbonate, poly(2,2'-dihydroxyphenylpropane) carbonate, poly diethylene glycol bis(allyl carbonate), polymethyl methacrylate, polystyrene and blends thereof. Furthermore, the at least one lens 24 may be formed by a manufacturing process such as injection molding and/or thermoforming, or by any other suitable manufacturing process.

As may be appreciated by one of ordinary skill, the enclosure of the lighting module 10 may be constructed or formed such that at least the PCBA 28, the at least one light source 30, the mask 16 and the at least one lens 24 are environmentally sealed within the lighting module 10 between the first and second portions 12, 40 by at least one sealing element 44, so as to be protected from such outside environmental elements as previously described herein. Optionally, the at least one power source 32 and/or the at least one sensor 34, 36, 38 may be environmentally sealed within the lighting module 10 between the first and second portions 12, 40 of the enclosure. The at least one sealing element 44 may be disposed between the first and second portions 12, 40, or between other portions of the lighting module 10 and a fluid delivery apparatus which includes the lighting module 10. As a non-limiting example, the at least one sealing element 44 is selected from the group consisting of a seal, a gasket, an O-ring, an adhesive, a cloth material, a cork material, a rubber material, a polymeric material and combinations thereof. It may be appreciated that, with the at least one light source 30 environmentally sealed within the enclosure of the lighting module 10 as described herein, the at least one light source 30 may be further protected from potential external damage and/or wear over time.

As further schematically shown in FIG. 1, the at least one light source 30 includes at least one light-emitting diode (LED) light 30. The at least one LED light 30 may include a plurality of LED lights 30. The plurality of LED lights 30 may each have a same or a different LED light output, such as measured in lumens. The plurality of LED lights 30 may each be of a same size or a different size relative to each other. The plurality of LED lights 30 may be configured to emit light of a same color, a different color or a combination of colors. As schematically shown in FIG. 1, the plurality of LED lights 30 may be arranged in at least one or more rows and/or patterns which correspond to an arrangement of the at least one non-opaque portion 20, 22 of the mask 16. The plurality of LED lights 30 may include two or more separate groups of LED lights 30. Each of the two or more separate groups of LED lights 30 may each have a same or a different LED light output, such as measured in lumens. Each of the two or more separate groups of LED lights 30 may be configured to emit light of a same color, a different color or a combination of colors. As further schematically shown in FIG. 1, each of the two or more separate groups of LED lights 30 may include LED lights 30 arranged in at least one or more rows and/or patterns which may correspond to an arrangement of the two or more non-opaque portions 20, 22 of the mask 16. The at least one LED light 30, which may include the plurality of LED lights 30, which may include the two or more separate groups of LED lights 30, as previously described herein, may emit light of a same color, a different color or a combination of colors. As non-limiting examples, such colors of light which may be emitted by the at least one LED light are selected from the group consisting of amber, aqua, black, blue, bright white, green, orange, pink, purple, red, soft white, teal, violet, warm white, white, yellow and combinations thereof.

Figure 8A:
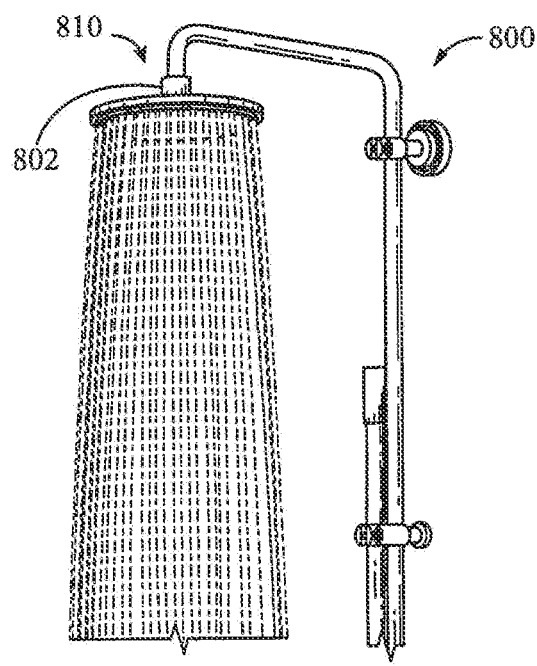
FIG. 8A is a perspective view of an exemplary fixed shower head.
Figures 8B, 8C, 8D:
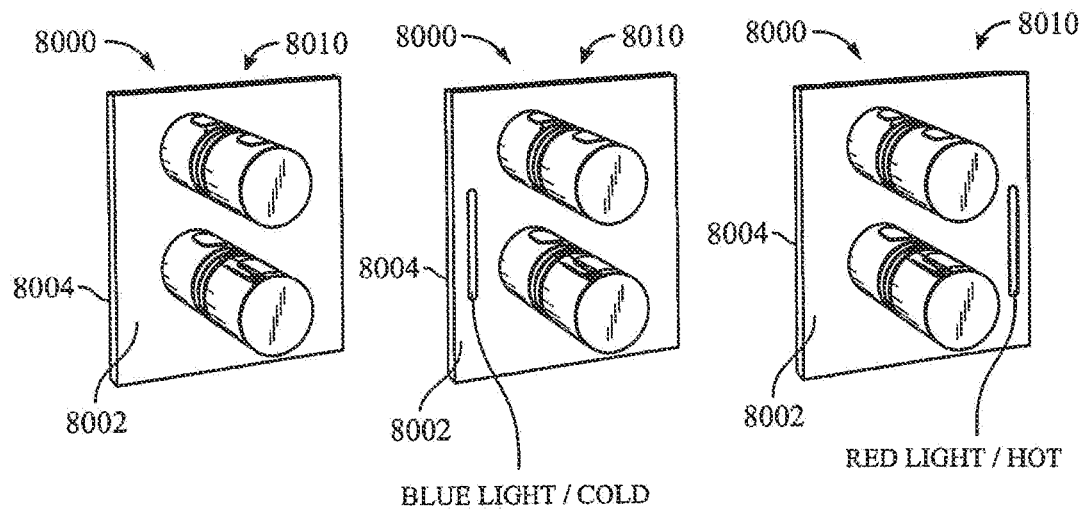
FIGS. 8B, 8C, and 8D are perspective views of an exemplary control valve system for controlling water flow to such a shower head as shown in FIG. 8A, the exemplary control valve system including yet another exemplary embodiment of a lighting module which may function in an unlit condition (FIG. 8B) or in various lit conditions (FIGS. 8C-8D)
Figure 9A:
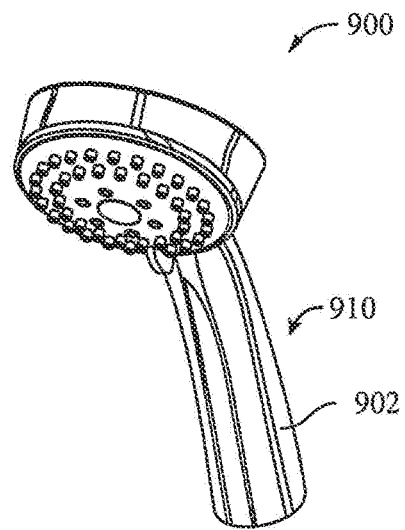
FIGS. 9A, 9B, 9C, and 9D are perspective views of an exemplary handheld shower head including yet another exemplary embodiment of a lighting module which may function in an unlit condition (FIG. 9A) or in various lit conditions (FIGS. 9B-9D)
Figure 9B:
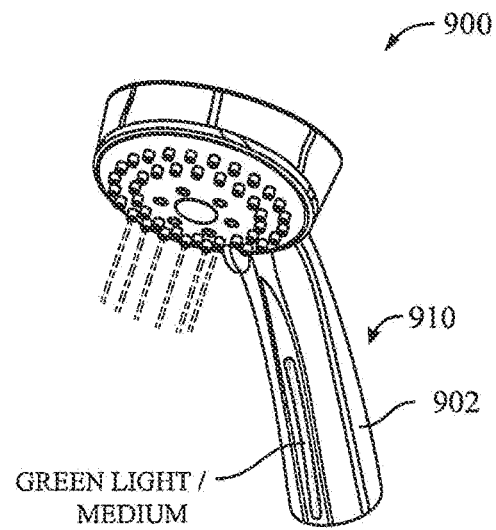
Figure 9C:
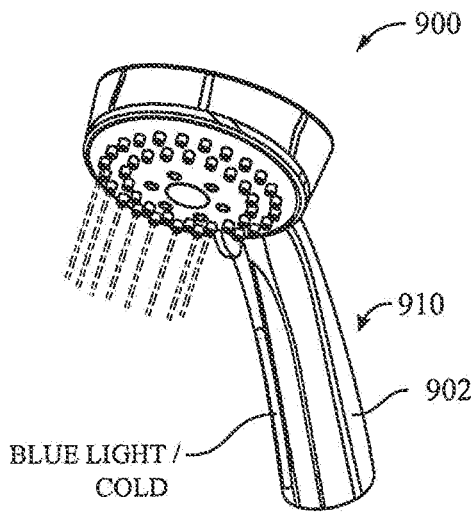
Figure 9D:
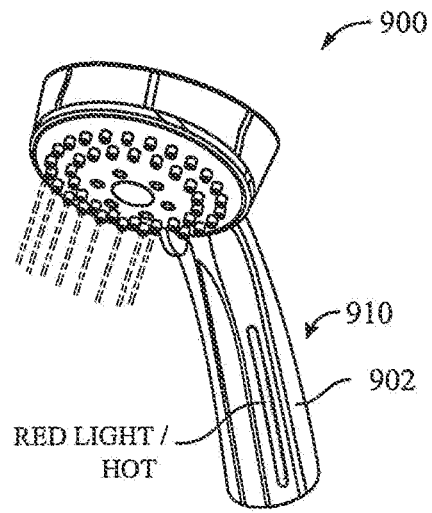

In operation of the lighting module 10, as previously described herein, the at least one light source 30 is configured to emit light based on at least the PCBA 28 receiving the sensed information from the at least one sensor 34, 36, 38. More specifically, the at least one sensor may include at least one motion sensor 38, such as a wired or wireless motion sensor 38, configured to sense motion of a human or other moving object within a range of distance from a fluid delivery apparatus which includes the lighting module 10. As a non-limiting example, a fluid delivery apparatus which includes the lighting module 10 may be a water tap 200, 300, 600 (as shown in FIGS. 2A-6C). The at least one motion sensor 38 may sense motion of a human or other moving object within a range of distance in a room, such as a kitchen, bathroom or restroom, from the water tap 200, 300, 600. In alternative non-limiting examples, a fluid delivery apparatus which includes the lighting module 10 may be a shower panel 700 (as shown in FIGS. 7A-7E), a fixed shower head 800 (as shown in FIG. 8A), a handheld shower head 900 (as shown in FIGS. 9A-9D) or a shower control valve system 8000 (as shown in FIGS. 8B-8D). The at least one motion sensor 38 may sense motion of a human or other moving object within a range of distance in a room, such as a bathroom, from the fixed shower head 800, the handheld shower head 900, or the shower control valve system 8000. In each of the aforementioned examples of fluid delivery apparatus which include the lighting module 10, at least one LED light 30 is disposed within the lighting module 10, which may include the plurality of LED lights 30, which may include at least one of the two or more separate groups of LED lights 30, and may be configured to emit light through at least one or more of the non-opaque portions 20, 22 of the mask 16 based on at least the PCBA 28 receiving sensed information from the at least one motion sensor 38, which indicates motion has been sensed within a range of distance from the fluid delivery apparatus. When light from the at least one light source 30 is emitted through the at least one or more non-opaque portions 20, 22 of the mask 16 as a result of at least motion being sensed by the at least one motion sensor 38, a shape of at least one image, such as a logo, a greeting (e.g. "Hello", "Good Morning", "Good Evening", etc.), lines corresponding to various features (e.g. components, edges, etc.) of the fluid delivery apparatus, or multiple "mood lighting" (FIG. 7E) features may be projected through at least the polymeric substrate 14 and chromium or chromium-based reflective coating 15 of the first portion 12 of the lighting module 10 and may be seen as lit from outside of the fluid delivery apparatus.

Figure 5A:
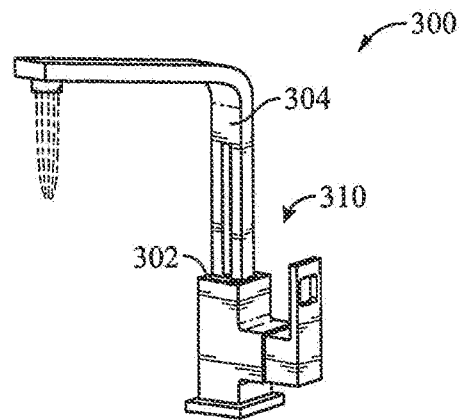
FIGS. 5A, 5B, and 5C are perspective views of the water tap shown in FIGS. 3A-3C, depicting the lighting module in a lit condition displaying various stages of a water flow countdown timer indicator.
Figure 5B:
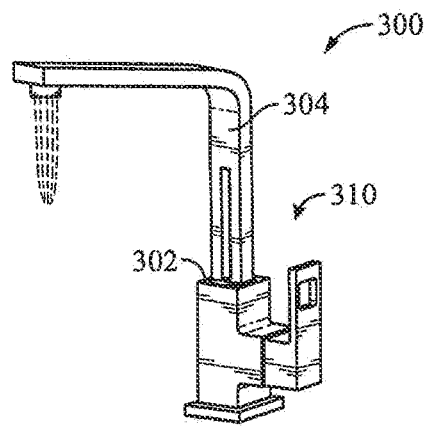
Figure 5C:
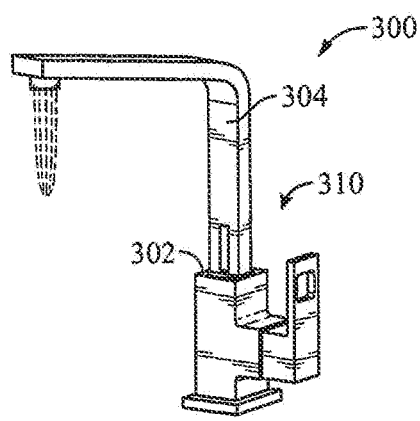
Figure 6A:
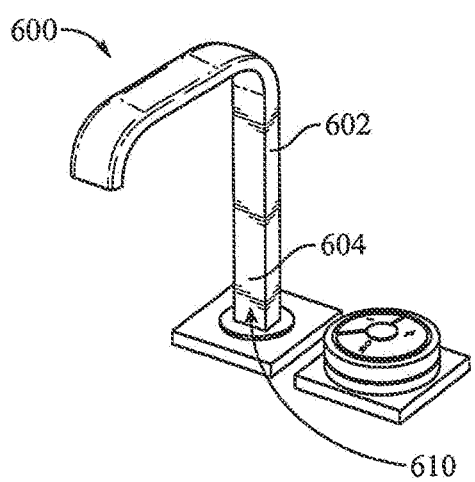
FIGS. 6A, 6B, and 6C are perspective views of another exemplary water tap including yet another exemplary embodiment of a lighting module which may function in an unlit condition (FIG. 6A) or in various lit conditions (FIGS. 6B-6C)
Figure 6B:
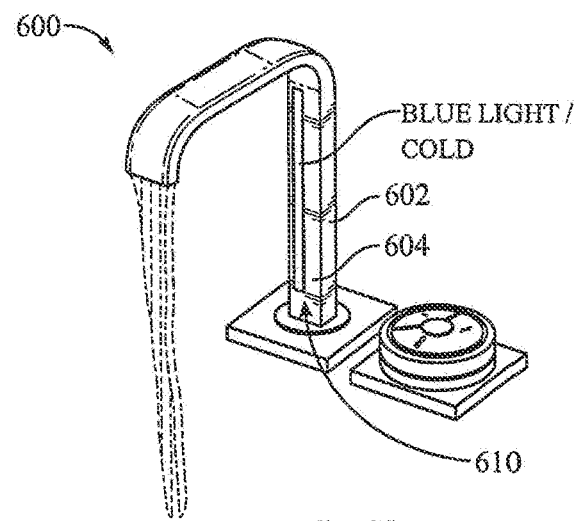
Figure 6C:
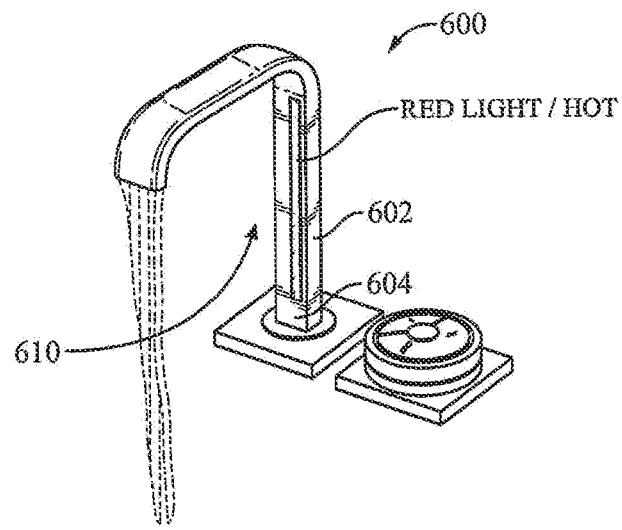
Figure 7A:
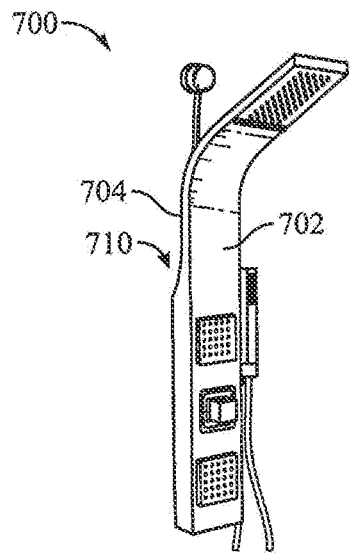
FIGS. 7A, 7B, 7C, 7D, and 7E are perspective views of an exemplary shower panel including yet another exemplary embodiment of a lighting module which may function in an unlit condition (FIG. 7A) or in various lit conditions (FIGS. 7B-7E)
Figure 7B:
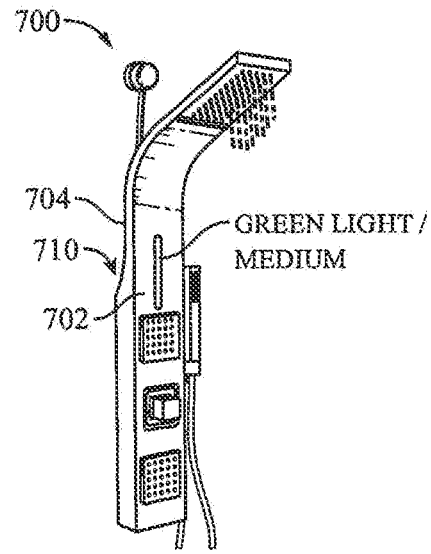
Figure 7C:
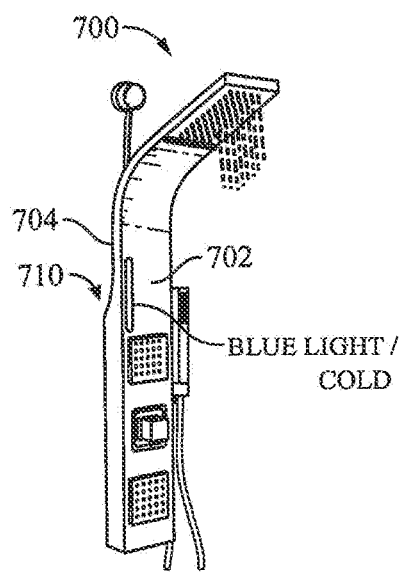
Figure 7D:
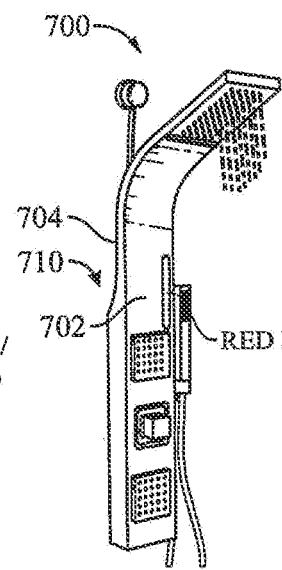
Figure 7E:
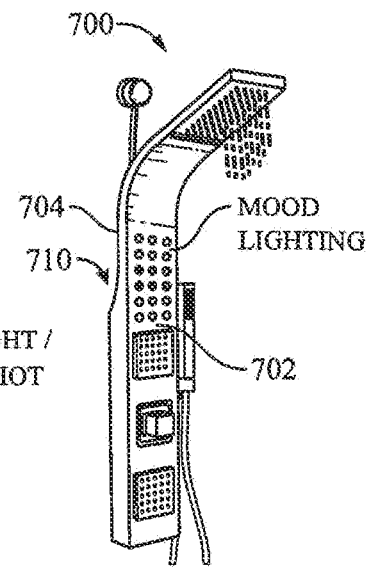
Figure 10A:
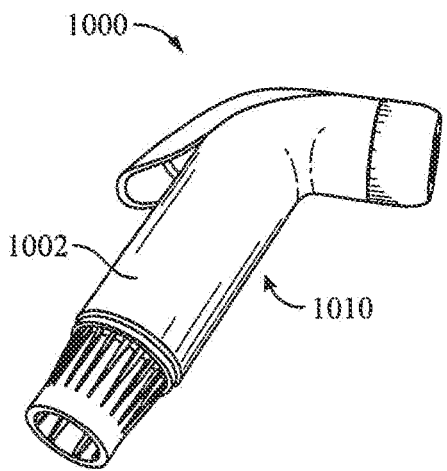
FIGS. 10A, 10B, 10C, and 10D are perspective views of an exemplary fluid nozzle including yet another exemplary embodiment of a lighting module which may function in an unlit condition (FIG. 10A) or in various lit conditions (FIGS. 10B-10D)
Figure 10B:
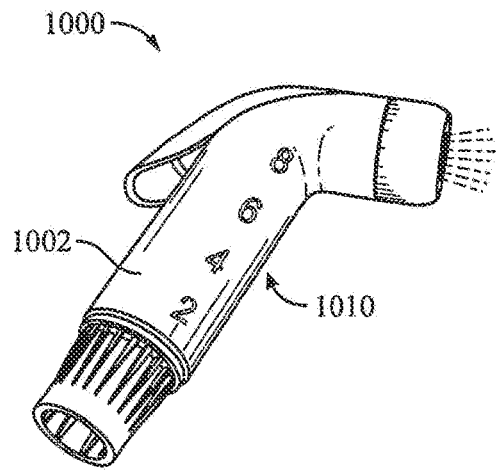
Figure 10C:
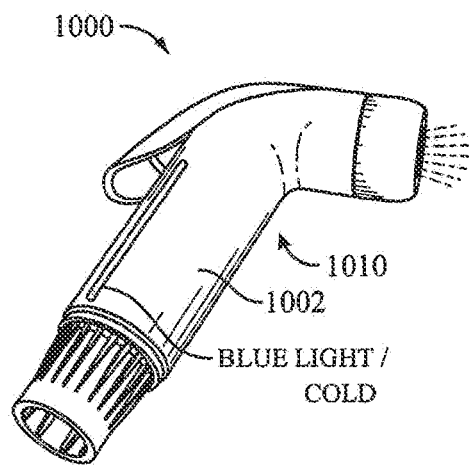
Figure 10D:
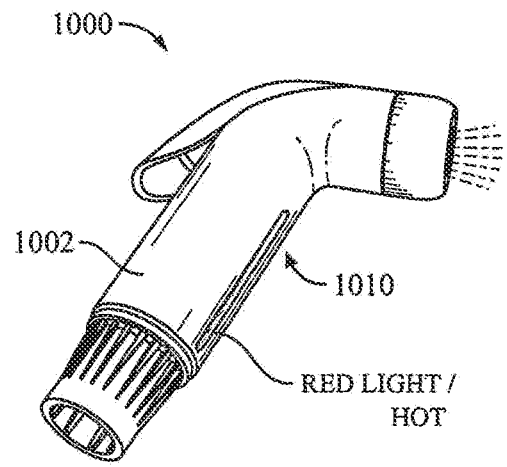
Figure 11A:
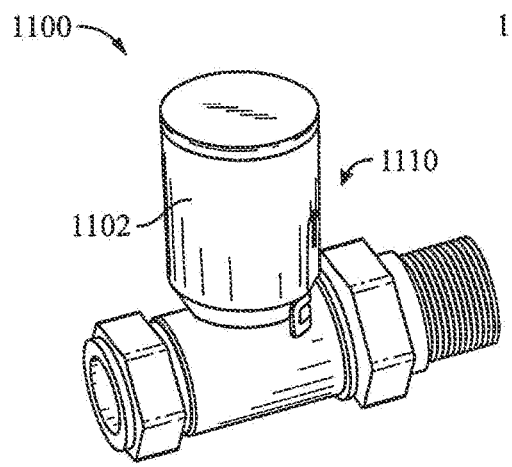
FIGS. 11A, 11C, and 11C are perspective views of an exemplary thermostatic valve including yet another exemplary embodiment of a lighting module which may function in an unlit condition (FIG. 11A) or in various lit conditions (FIGS. 11B-11C).
Figure 11B:
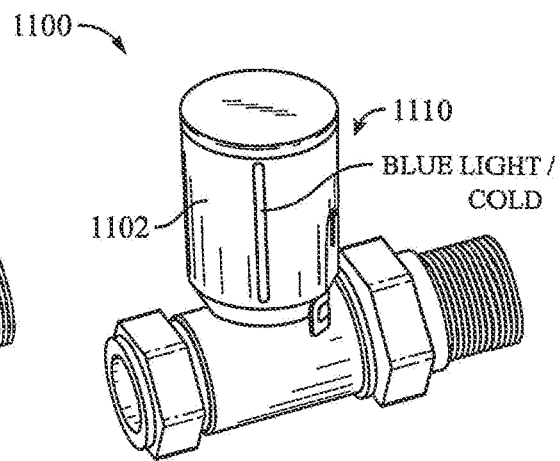
Figure 11C:
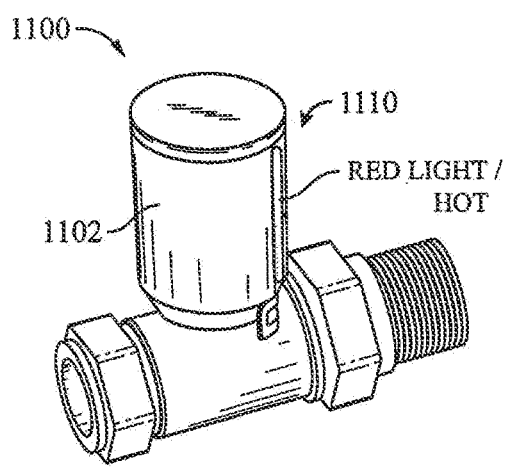

Furthermore, in operation of the lighting module 10, the at least one sensor may include at least one fluid flow sensor 36, such as a wired, wireless or mechanical fluid flow sensor 36, configured to sense a flow of fluid or a fluid flow rate flowing through a fluid delivery apparatus. As non-limiting examples, with some previously described herein, a fluid delivery apparatus which includes the lighting module 10 may be a water tap 200, 300, 600 (as shown in FIGS. 2A-6C), a shower panel 700 (as shown in FIGS. 7A-7E), a fixed shower head 800 (as shown in FIG. 8A), a handheld shower head 900 (as shown in FIGS. 9A-9D), a shower control valve system 8000 (as shown in FIGS. 8B-8D), a fluid nozzle 1000 (as shown in FIGS. 10A-10D) or a thermostatic valve 1100 (as shown in FIGS. 11A-11C). In each of the aforementioned examples of fluid delivery apparatus which includes the lighting module 10, at least one LED light 30 is disposed within the lighting module 10, which may include the plurality of LED lights 30, which may include at least one of the two or more separate groups of LED lights 30, and may be configured to emit light through at least one or more of the non-opaque portions 20, 22 of the mask 16 based on at least the PCBA 28 receiving sensed information from the at least one fluid flow sensor 36, which indicates at least a flow of fluid or a rate of fluid flow has been sensed flowing through the fluid delivery apparatus. When light from the at least one light source 30 is emitted through the at least one or more non-opaque portions 20, 22 of the mask 16 as a result of at least fluid flow or a fluid flow rate being sensed by the at least one fluid flow sensor 36, a shape of at least one image, such as a fluid flow bar indicator (as shown in FIGS. 5A-5C), a numerical fluid flow level indicator (as shown in FIG. 10B), a logo, a greeting (e.g. "Hello", "Good Morning", "Good Evening", etc.), a message (e.g. "Please Conserve Water"), lines corresponding to various features (e.g. components, edges, etc.) of the fluid delivery apparatus, or multiple "mood lighting" features (FIG. 7E) may be projected through at least the polymeric substrate 14 and chromium or chromium-based reflective coating 15 of the first portion 12 of the lighting module 10 and may be seen as lit from outside of the fluid delivery apparatus.

Alternatively, in combination with the at least one fluid flow sensor 36, the PCBA 28 may further include at least one adjustable timer circuit 39. As further schematically shown in FIG. 1, the at least one adjustable timer circuit 39 includes a clock function and is configured to determine and/or be programed to determine a time of day, a week, a month or a year. Additionally, the at least one adjustable timer circuit 39 is configured to measure or otherwise determine a period of time, such as a time period of fluid flow. In this exemplary configuration, the at least one LED light 30 which may be disposed within the lighting module 10, which may include the plurality of LED lights 30, which may include at least one of the two or more separate groups of LED lights 30, may be configured to emit light through at least one or more of the non-opaque portions 20, 22 of the mask 16 based on at least the PCBA 28 receiving sensed information from the at least one fluid flow sensor 36, and incrementally decrease an amount of the emitted light (e.g. displaying various stages of a water flow countdown timer indicator, as shown in FIGS. 5A-5C) based on at least one fluid flow time threshold being met by the at least one adjustable timer circuit 39. Such a configuration may provide an "eco-friendly" reminder, such as when using a water tap, to shut off the water tap and conserve water. Alternatively, such a configuration may be used in water taps having automatic timed water shutoff function, and may warn or otherwise indicate to a user when the water tap will automatically shut off.

Furthermore, in operation of the lighting module 10, the at least one sensor may include at least one fluid temperature sensor 34, such as a wired or wireless fluid temperature sensor 34, configured to sense a temperature of fluid flowing through a fluid delivery apparatus. As non-limiting examples, as previously described herein, a fluid delivery apparatus which includes the lighting module 10 may be a water tap 200, 300, 600 (as shown in FIGS. 2A-6C), a shower panel 700 (as shown in FIGS. 7A-7E), a fixed shower head 800 (as shown in FIG. 8A), a handheld shower head 900 (as shown in FIGS. 9A-9D), a shower control valve system 8000 (as shown in FIGS. 8B-8D), a fluid nozzle 1000 (as shown in FIGS. 10A-10D) or a thermostatic valve 1100 (as shown in FIGS. 11A-11C). In each of the aforementioned examples of fluid delivery apparatus which include the lighting module 10, at least one LED light 30 may be disposed within the lighting module 10, which may include the plurality of LED lights 30, which may include at least one of the two or more separate groups of LED lights 30, and may be configured to emit light through at least one or more of the non-opaque portions 20, 22 of the mask 16 based on at least the PCBA 28 receiving sensed information from the at least one fluid temperature sensor 34. More specifically, for example, at least a first group of LED lights 30 of the two or more separate groups of LED 30 lights may be configured to emit light, for example a blue colored light (e.g. indicating "cold" temperature), through at least a first non-opaque portion of the two or more non-opaque portions 20, 22 of the mask 16 based on at least the PCBA 28 receiving sensed information from the at least one fluid temperature sensor 34, the sensed information indicating at least a fluid temperature is within a first temperature range. As a non-limiting example, a first temperature range may relate to water flowing out of a fluid delivery apparatus, and may be a temperature range of about 1° C. to about 31° C. Additionally, at least a second group of LED lights 30 of the two or more separate groups of LED lights 30 may be configured to emit light, for example a red colored light (e.g. indicating "hot" temperature), through at least a second non-opaque portion of the two or more non-opaque portions 20, 22 of the mask 16 based on at least the PCBA 28 receiving sensed information from the at least one fluid temperature sensor 34, the sensed information indicating at least a fluid temperature is within a second temperature range. As a non-limiting example, a second temperature range may relate to water flowing out of a fluid delivery apparatus, and may be a temperature range of above 31° C. to about 49° C. Additionally, at least a third group of LED lights 30 of the two or more separate groups of LED lights 30 may be configured to emit light, for example a green colored light (e.g. indicating "lukewarm" or "medium" temperature) through at least a third non-opaque portion of the two or more non-opaque portions 20, 22 of the mask 16 based on at least the PCBA 28 receiving sensed information from the at least one fluid temperature sensor 34, the sensed information indicating at least a fluid temperature is within a third temperature range. As a non-limiting example, a third temperature range may relate to water flowing out of a fluid delivery apparatus, and may be a temperature range of about 17° C. to about 33° C. In each of the above examples, when light from the at least one light source 30, which may include at least the first, second and third groups of LED lights 30 of the two or more separate groups of LED lights 30, is emitted through the at least one or more non-opaque portions 20, 22 of the mask 16 as a result of at least one fluid temperature or fluid temperature within a temperature range being sensed by the at least one fluid temperature sensor 34, a shape of at least one image, such as a fluid temperature indicator (as shown in FIGS. 2B, 2C, 3B, 3C, 6B, 6C, 7B-7D, 9B-9D, 10C, 10D, 11B and 11C), a logo, a greeting (e.g. "Hello", "Good Morning", "Good Evening", etc.), a temperature readout number, a message (e.g. "Please Conserve Water", "Cold Water", "Hot Water", etc.), lines corresponding to various features (e.g. components, edges, etc.) of the fluid delivery apparatus, or multiple "mood lighting" features (FIG. 7E) may be projected through at least the polymeric substrate 14 and chromium or chromium-based reflective coating 15 of the first portion 12 of the lighting module 10 and may be seen as lit from outside of the fluid delivery apparatus.

Referring to FIGS. 2A-11C, various exemplary fluid delivery apparatus capable of selectively carrying or dispensing a flow of fluid may include an exemplary lighting module 10 as schematically shown in FIG. 1 and as described herein. As a non-limiting example, the fluid delivery apparatus is selected from the group consisting of a tap 200, 300, 600, a faucet 200, 300, 600, a spigot, a shower panel 700, a shower control valve system 8000, a shower head 800, 900, a fixed shower head 800, a handheld shower head 900, a fluid nozzle 1000 and a thermostatic valve 1100. It may be appreciated by one of ordinary skill that the lighting module 10, and therefore the various components which the lighting module 10 may include (as previously described herein), may be sized and/or shaped to correspond to the particular fluid delivery apparatus which includes the lighting module 10.

Referring to FIGS. 2A-6C, as non-limiting examples, fluid delivery apparatus such as exemplary water taps 200, 300, 600 each include a lighting module 10 (e.g. such as schematically shown and described herein) in the form of respective exemplary lighting modules 210, 310, 610. As such, the lighting modules 210, 310, 610 are each configured to be included or integrated as part of the respective water taps 200, 300, 600. As shown in FIGS. 2A-6C, the water taps 200, 300, 600 may exhibit (i.e. experience) various possible unlit and lit conditions in which the respective lighting modules 210, 310, 610 may function, in such manners as previously described herein. The lighting modules 210, 310, 610 may be part of at least respective spout assemblies 202, 302, 602 of the respective water taps 200, 300, 600. In describing the lighting modules 210, 310, 610, using previous reference numerals of the exemplary lighting module 10 for simplicity, the first portion 12 of the lighting module 10 may be part of at least a first portion 204, 304, 604 (e.g. outer and/or front exterior portion) of each respective spout assembly 202, 302, 602 of each respective water tap 200, 300, 600. In one exemplary configuration, the first portion 12 of the lighting module 10 may be generally curved in at least one section thereof, as is the case with at least the first portion 204 of spout assembly 202 of water tap 200. Alternatively, the first portion 12 of the lighting module 10 may be generally planar in at least one section thereof, as is the case with at least each of the first portions 304, 604 of each respective spout assembly 302, 602 of respective water taps 300, 600. Similarly, the second portion 40 of the lighting module 10 may be part of at least a second portion of each respective spout assembly 202, 302, 602 of each respective water tap 200, 300, 600. In the case of spout assembly 202 of water tap 200, the second portion (not shown) may be concentrically disposed within the first portion 204 (e.g. configured to surround a fluid pipe or conduit extending through the spout assembly 202 of water tap 200). In the case of each spout assembly 302, 602 of respective water taps 300, 600, the second portion may be assembled or formed as part of the remaining spout assembly 302, 602, such as on a rear side or exterior portion of the spout assembly 302, 604, as may be understood by one of ordinary skill. As such, the PCBA 28, the at least one light source 30, the mask 16 and the at least one lens 24 of lighting module 10 may be environmentally sealed within each respective spout assembly 202, 302, 602 between the first portion 204, 304, 604 and the second portion of each respective spout assembly 202, 302, 602 (i.e. depending on the particular configuration) of each respective water tap 200, 300, 300, in a manner as previously described herein.

Referring to FIGS. 7A-7E, as a non-limiting example, a fluid delivery apparatus such as an exemplary shower panel 700 includes a lighting module 10 (e.g. such as schematically shown and described herein) in the form of an exemplary lighting module 710. As such, the lighting module 710 is configured to be included or integrated as part of the shower panel 700. As shown in FIGS. 7A-7E, the shower panel 700 may exhibit (i.e. experience) various possible unlit and lit conditions in which the lighting module 710 may function, in such manners as previously described herein. In describing the lighting module 710, using previous reference numerals of the exemplary lighting module 10 for simplicity, the first portion 12 of the lighting module 10 may be generally planar in at least one section thereof and may be part of at least a front generally planar portion 702 of the shower panel 700. Similarly, the second portion 40 of the lighting module 10 may be part of at least a rear portion 704 of the shower panel 700. As such, the PCBA 28, the at least one light source 30, the mask 16 and the at least one lens 24 of lighting module 10 may be environmentally sealed within the shower panel 700 between at least the front generally planar portion 702 and the rear portion 704 of the shower panel 700, in a manner as previously described herein.

Referring to FIGS. 8B-8D, as a non-limiting example, a fluid delivery apparatus such as an exemplary shower control valve system 8000 includes a lighting module 10 (e.g. such as schematically shown and described herein) in the form of an exemplary lighting module 8010. As such, the lighting module 8010 is configured to be included or integrated as part of the shower control valve system 8000. As shown in FIGS. 8B-8D, the shower control valve system 8000 may exhibit (i.e. experience) various possible unlit and lit conditions in which the lighting module 8010 may function, in such manners as previously described herein. The shower control valve system 8000 may be used to control flow and/or temperature of water flowing out of a bath tub spout (not shown) or shower heads 800, 900, such as shown in FIGS. 8A and 9A-9D. In describing the lighting module 8010, using previous reference numerals of the exemplary lighting module 10 for simplicity, the first portion 12 of the lighting module 10 may be generally planar in at least one section thereof and may be part of at least a front portion of an escutcheon 8002 of the shower control valve system 8000. Similarly, the second portion 40 of the lighting module 10 may be part of at least a rear portion 8004 of the shower control valve system 8000. As such, the PCBA 28, the at least one light source 30, the mask 16 and the at least one lens 24 of lighting module 10 may be environmentally sealed within the shower control valve system 8000 between at least the front portion of the escutcheon 8002 of the shower control valve system 8000 and the rear portion 8004 of the shower control valve system 8000, in a manner as previously described herein.

Referring to FIGS. 8A and 9A-9D, as non-limiting examples, fluid delivery apparatus such as exemplary shower heads 800, 900 each include a lighting module 10 (e.g. such as schematically shown and described herein) in the form of respective exemplary lighting modules 810, 910. As such, the lighting modules 810, 910 are each configured to be included or integrated as part of the respective shower heads 800, 900. As shown in FIGS. 8A and 9A-9D, as non-limiting examples, the shower head 800 may be a fixed shower head 800, such as a rain shower head 800, and alternatively, the shower head 900 may be a handheld shower head 900. As shown particularly in FIGS. 9A-9D (although the same may generally apply to the fixed shower head 800 shown in FIG. 8A), the shower heads 800, 900 may exhibit (i.e. experience) various possible unlit and lit conditions in which the respective lighting modules 810, 910 may function, in such manners as previously described herein. In describing the lighting modules 810, 910, using previous reference numerals of the exemplary lighting module 10 for simplicity, the first portion 12 of the lighting module 10 may be part of at least a first portion 802, 902 of the respective shower heads 800, 900, the first portion 802, 902 having at least an exterior surface. Similarly, the second portion 40 of the lighting module 10 may be part of at least a second portion (not shown) of the respective shower heads 800, 900, which may be concentrically disposed within the respective first portion 802, 902 (e.g. configured to surround a fluid pipe or conduit extending through the respective shower head 800, 900). As such, the PCBA 28, the at least one light source 30, the mask 16 and the at least one lens 24 of lighting module 10 may be environmentally sealed within the respective shower heads 800, 900 between the first portion 802, 902 and the second portion (not shown) of the respective shower heads 800, 900, in a manner as previously described herein.

Referring to FIGS. 10A-10D, as a non-limiting example, a fluid delivery apparatus such as an exemplary fluid nozzle 1000 includes a lighting module (e.g. such as schematically shown and described herein) in the form of an exemplary lighting module 1010. As such, the lighting module 1010 is configured to be included or integrated as part of the fluid nozzle 1000. As non-limiting examples, the fluid nozzle 1000 may be a garden hose nozzle, a nozzle sprayer used in a kitchen or bathroom, or may be an industrial grade nozzle for dispensing industrial fluids such as chemicals or oils, such as motor oil. As shown in FIGS. 10A-10D, the fluid nozzle 1000 may exhibit (i.e. experience) various possible unlit and lit conditions in which the lighting module 1010 may function, in such manners as previously described herein. In describing the lighting module 1010, using previous reference numerals of the exemplary lighting module 10 for simplicity, the first portion 12 of the lighting module 10 may be part of at least a first portion 1002 of the fluid nozzle 1000, the first portion 1002 having at least an exterior surface. Similarly, the second portion 40 of the lighting module 10 may be part of at least a second portion (not shown) of the fluid nozzle 1000, which may be concentrically disposed within the first portion 1002 (e.g. configured to surround a fluid pipe or conduit extending through the fluid nozzle 1000). As such, the PCBA 28, the at least one light source 30, the mask 16 and the at least one lens 24 of lighting module 10 may be environmentally sealed within the fluid nozzle 1000 between the first portion 1002 and the second portion (not shown) of the fluid nozzle 1000, in a manner as previously described herein.

Referring to FIGS. 11A-11C, as a non-limiting example, a fluid delivery apparatus such as an exemplary thermostatic valve 1100 includes a lighting module 10 (e.g. such as schematically shown and described herein) in the form of an exemplary lighting module 1110. As such, the lighting module 1110 is configured to be included or integrated as part of the thermostatic valve 1100. As shown in FIGS. 11A-11C, the thermostatic valve 1100 may exhibit (i.e. experience) various possible unlit and lit conditions in which the lighting module 1110 may function, in such manners as previously described herein. In describing the lighting module 1110, using previous reference numerals of the exemplary lighting module 10 for simplicity, the first portion 12 of the lighting module 10 may be part of at least a first portion 1102 of the thermostatic valve 1100, the first portion 1102 having at least an exterior surface. Similarly, the second portion 40 of the lighting module 10 may be part of at least a second portion (not shown) of the thermostatic valve 1100, which may be concentrically disposed within the first portion 1102 (e.g. configured to surround a fluid pipe, tubing, stem or conduit extending through the thermostatic valve 1100). As such, the PCBA 28, the at least one light source 30, the mask 16 and the at least one lens 24 of lighting module 10 may be environmentally sealed within the thermostatic valve 1100 between the first portion 1102 and the second portion (not shown) of the thermostatic valve 1100, in a manner as previously described herein.

The exemplary lighting modules for fluid delivery apparatus, as shown and described herein, are therefore capable of overcoming several known disadvantages, challenges and limitations, and advantageously provide various fluid delivery apparatus, particularly those having a reflective coating coated thereon, integrated lighting which is capable of at least (i) being hidden or concealed when not emitting light, (ii) capable of being protected from potential external damage and/or wear and (iii) capable of increasing the amount of possible lighting design elements or functional lighting features that may be provided on the fluid delivery apparatus.

While multiple exemplary embodiments of lighting modules for fluid delivery apparatus, and fluid delivery apparatus which include such lighting modules, are described above in detail, it is not intended that these embodiments describe all possible forms of the disclosure. Rather, the words used in the specification are words of description rather than limitation, and it is understood that various changes may be made without departing from the spirit and scope of the disclosure.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It should be further understood that certain steps could be performed simultaneously, that other steps could be added, or that certain steps described herein could be omitted. In other words, the descriptions of processes described above are provided for the purpose of illustrating certain embodiments, and should in no way be construed so as to limit the claims.

The features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

As used in this specification and claims, the terms "for example"/("e.g."), "for instance", "such as", and "like", and the verbs "comprising", "having", "including", and their other verb forms, when used in conjunction with a listing of one or more carriers or other items, are each to be construed as open-ended, meaning that the listing is not to be considered as excluding other, additional carriers or items. Other terms are to be construed using their broadest reasonable meaning unless they are used in a context that requires a different interpretation.

REFERENCE SIGNS 10 exemplary fluid delivery apparatus lighting module
12 first portion/first portion of enclosure
14 polymeric substrate of first portion
15 chromium or chromium-based reflective coating
16 mask
18 opaque portion of mask
20 non-opaque portion of mask
22 non-opaque portion of mask
24 lens
26 lens surface
28 printed circuit board assembly (PCBA)
30 light source
32 power source
34 fluid temperature sensor
36 fluid flow sensor
38 motion sensor
39 adjustable timer circuit of PCBA
40 second portion/second portion of enclosure
42 space or mounting area
44 sealing element
200 exemplary water tap
202 spout assembly of water tap
204 first portion of spout assembly
210 exemplary fluid delivery apparatus lighting module for water tap
300 another exemplary water tap
302 spout assembly of water tap
304 first portion of spout assembly
310 another exemplary fluid delivery apparatus lighting module for water tap
600 another exemplary water tap
602 spout assembly of water tap
604 first portion of spout assembly
610 another exemplary fluid delivery apparatus lighting module for water tap
700 exemplary shower panel
702 front generally planar portion of shower panel
704 rear portion of shower panel
710 exemplary fluid delivery apparatus lighting module for shower panel
800 exemplary fixed shower head
802 first portion of fixed shower head, having at least an exterior surface
810 exemplary fluid delivery apparatus lighting module for fixed shower head
8000 exemplary shower control valve system
8002 escutcheon of shower control valve system
8004 rear portion of shower control valve system
8010 exemplary fluid delivery apparatus lighting module for shower control valve system
900 exemplary handheld shower head
902 first portion of handheld shower head, having at least an exterior surface
910 exemplary fluid delivery apparatus lighting module for handheld shower head
1000 exemplary fluid nozzle
1002 first portion of fluid nozzle, having at least an exterior surface
1010 exemplary fluid delivery apparatus lighting module for fluid nozzle
1100 exemplary thermostatic valve
1102 first portion of thermostatic valve, having at least an exterior surface
1110 exemplary fluid delivery apparatus lighting module for thermostatic valve

What is claimed is:

1. A fluid delivery apparatus lighting module, comprising:
a first portion comprising a polymeric substrate having a chromium or chromium-based reflective coating coated on at least an outer surface of the polymeric substrate, the polymeric substrate and chromium or chromium-based reflective coating being at least partially permeable to light;
at least one light source disposed within the fluid delivery apparatus lighting module, wherein the at least one light source is configured to receive power from at least one power source and emit light through at least the polymeric substrate and chromium or chromium-based reflective coating of the first portion, and wherein the at least one light source, when emitting no light in an unlit condition, is concealed within the fluid delivery apparatus lighting module behind at least the polymeric substrate and chromium or chromium-based reflective coating of the first portion; and
at least one sensor selected from the group consisting of a wired fluid temperature sensor, a wireless fluid temperature sensor, a wired fluid flow sensor, a wireless fluid flow sensor, a mechanical fluid flow sensor, a mechanical sensor, a wired motion sensor, a wireless motion sensor, and combinations thereof,
wherein at least one of:
the at least one light source is configured to emit the light based on at least the fluid delivery apparatus lighting module receiving sensed information from the at least one sensor, and/or
a printed circuit board assembly (PCBA) is disposed within the fluid delivery apparatus lighting module and electrically-connected to the at least one light source, the PCBA being configured to receive the power from the at least one power source and distribute the received power to at least the at least one light source, with the at least one sensor being in communication with the PCBA for communicating sensed information to the PCBA, wherein the at least one light source is configured to emit the light based on at least the PCBA receiving the sensed information from the at least one sensor.

2. The fluid delivery apparatus lighting module according to claim 1, further comprising a mask disposed within the fluid delivery apparatus lighting module, the mask including at least one opaque portion configured to be impermeable to the light emitted by the at least one light source and at least one non-opaque portion configured to be permeable to the light emitted by the at least one light source,
wherein the mask is disposed on or near at least an inner surface of the polymeric substrate of the first portion.

3. The fluid delivery apparatus lighting module according to claim 2, further comprising at least one lens disposed within the fluid delivery apparatus lighting module between the mask and the at least one light source,
wherein the at least one lens is configured to receive the light emitted by the at least one light source and homogeneously distribute the received light through the at least one non-opaque portion of the mask and through at least the polymeric substrate and chromium or chromium-based reflective coating of the first portion.

4. The fluid delivery apparatus lighting module according to claim 3, wherein the at least one non-opaque portion of the mask comprises at least one opening configured to be permeable to the light emitted by the at least one light source.

5. The fluid delivery apparatus lighting module according to claim 2, wherein the at least one non-opaque portion of the mask is shaped to correspond to a shape of at least one image such that when the light from the at least one light source is emitted through the at least one non-opaque portion of the mask, the shape of the at least one image is projected through at least the polymeric substrate and chromium or chromium-based reflective coating of the first portion and is seen lit from outside of the fluid delivery apparatus lighting module, and wherein the at least one image is selected from the group consisting of logos, lines, letters, numbers, shapes, a rectangle, a square, a triangle, a trapezoid, a parallelogram, a pentagon, a hexagon, a heptagon, an octagon, a nonagon, a decagon, a circle, an oval, an arc, a cross, a tree, a water drop, a snowflake, a flame, a heatwave, a thermometer, a star, a lightning bolt, and combinations thereof.

6. A fluid delivery apparatus capable of selectively carrying or dispensing a flow of fluid, the fluid delivery apparatus comprising the fluid delivery apparatus lighting module of claim 1.

7. The fluid delivery apparatus according to claim 6, wherein the fluid delivery apparatus is selected from the group consisting of a tap, a faucet, a spigot, a shower panel, a shower control valve system, a shower head, a fixed shower head, a handheld shower head, a fluid nozzle, and a thermostatic valve.

8. The fluid delivery apparatus according to claim 6, further comprising:
- a water tap comprising the fluid delivery apparatus lighting module, wherein the first portion of the fluid delivery apparatus lighting module is generally curved in at least one section thereof and is part of at least a spout assembly of the water tap, wherein the at least one light source of the fluid delivery apparatus lighting module is environmentally sealed within the spout assembly of the water tap,
- a water tap comprising the fluid delivery apparatus lighting module, wherein the first portion of the fluid delivery apparatus lighting module is generally planar in at least one section thereof and is part of at least a spout assembly of the water tap, and wherein the at least one light source of the fluid delivery apparatus lighting module is environmentally sealed within the spout assembly of the water tap,
- a shower panel comprising the fluid delivery apparatus lighting module, wherein the first portion of the fluid delivery apparatus lighting module is generally planar in at least one section thereof and is part of at least a front generally planar portion of the shower panel, and wherein the at least one light source of the fluid delivery apparatus lighting module is environmentally sealed within the shower panel,
- a shower control valve system comprising the fluid delivery apparatus lighting module, wherein the first portion of the fluid delivery apparatus lighting module is generally planar in at least one section thereof and is part of at least a front portion of an escutcheon of the shower control valve system, and wherein the at least one light source of the fluid delivery apparatus lighting module is environmentally sealed within the shower control valve system,
- a shower head comprising the fluid delivery apparatus lighting module, wherein the first portion of the fluid delivery apparatus lighting module is part of at least a first portion of the shower head, the first portion of the shower head having at least an exterior surface, wherein the at least one light source of the fluid delivery apparatus lighting module is environmentally sealed within the shower head, and wherein the shower head is a fixed shower head or a handheld shower head,
- a fluid nozzle comprising the fluid delivery apparatus lighting module, wherein the first portion of the fluid delivery apparatus lighting module is part of at least a first portion of the fluid nozzle, the first portion of the fluid nozzle having at least an exterior surface, and wherein the at least one light source of the fluid delivery apparatus lighting module is environmentally sealed within the fluid nozzle, or
- a thermostatic valve comprising the fluid delivery apparatus lighting module, wherein the first portion of the fluid delivery apparatus lighting module is part of at least a first portion of the thermostatic valve, the first portion of the thermostatic valve having at least an exterior surface, and wherein the at least one light source of the fluid delivery apparatus lighting module is environmentally sealed within the thermostatic valve.

9. The fluid delivery apparatus lighting module according to claim 1, wherein the at least one light source comprises at least one light-emitting diode (LED) light.

10. The fluid delivery apparatus lighting module according to claim 9, wherein the at least one LED light comprises at least one of:
- a plurality of LED lights configured to emit light of a same color,
- a plurality of LED lights configured to emit light of different colors,
- a plurality of LED lights configured to emit light of a combination of colors,
- a plurality of LED lights arranged in at least one of one or more rows or patterns, or
- a plurality of LED lights comprising two or more separate groups of LED lights, each of the two or more separate groups of LED lights including LED lights arranged in at least one of one or more rows or patterns, wherein each of the two or more separate groups of LED lights are configured to emit light of a same color, a different color, or a combination of colors.

11. The fluid delivery apparatus lighting module according to claim 1, wherein the at least one power source is selected from the group consisting of a wired power source, a wireless power source, at least one battery, a fluid-driven electric power generator and combinations thereof.

12. The fluid delivery apparatus lighting module according to claim 1, further comprising a second portion, wherein at least the PCBA and the at least one light source are environmentally sealed within the fluid delivery apparatus lighting module between the first and second portions of the fluid delivery apparatus lighting module.

13. The fluid delivery apparatus lighting module according to claim 1, comprising:
- an enclosure including at least the first portion and a second portion, the first portion comprising the polymeric substrate having the chromium or chromium-based reflective coating coated on at least an outer surface of the polymeric substrate, the polymeric substrate and chromium or chromium-based reflective coating being at least partially permeable to light;

a printed circuit board assembly (PCBA) disposed within the enclosure and electrically-connected to the at least one light source, the PCBA configured to receive power from the at least one power source;

at least one sensor in communication with the PCBA for communicating sensed information to the PCBA, wherein the at least one light source is configured to emit light based on at least the PCBA receiving the sensed information from the at least one sensor;

a mask disposed within the enclosure, the mask including at least one opaque portion configured to be impermeable to the light emitted by the at least one light source and at least one non-opaque portion configured to be permeable to the light emitted by the at least one light source; and at least one lens disposed within the enclosure between the mask and the at least one light source, the at least one lens configured to receive the light emitted by the at least one light source and homogeneously distribute the received light through the at least one non-opaque portion of the mask and through the polymeric substrate and chromium or chromium-based reflective coating of the first portion of the enclosure.

14. A fluid delivery apparatus lighting module, comprising:

a first portion comprising a polymeric substrate having a chromium or chromium-based reflective coating coated on at least an outer surface of the polymeric substrate, the polymeric substrate and chromium or chromium-based reflective coating being at least partially permeable to light;

at least one light source disposed within the fluid delivery apparatus lighting module, wherein the at least one light source is configured to receive power from at least one power source and emit light through at least the polymeric substrate and chromium or chromium-based reflective coating of the first portion, and wherein the at least one light source, when emitting no light in an unlit condition, is concealed within the fluid delivery apparatus lighting module behind at least the polymeric substrate and chromium or chromium-based reflective coating of the first portion; and at least one sensor selected from the group consisting of a wired fluid temperature sensor, a wireless fluid temperature sensor, a wired fluid flow sensor, a wireless fluid flow sensor, a mechanical fluid flow sensor, a mechanical sensor, a wired motion sensor, a wireless motion sensor, and combinations thereof, wherein the at least one light source is configured to emit the light based on at least the fluid delivery apparatus lighting module receiving sensed information from the at least one sensor.

15. A fluid delivery apparatus lighting module, comprising:

a first portion comprising a polymeric substrate having a chromium or chromium-based reflective coating coated on at least an outer surface of the polymeric substrate, the polymeric substrate and chromium or chromium-based reflective coating being at least partially permeable to light;

at least one light source disposed within the fluid delivery apparatus lighting module, wherein the at least one light source is configured to receive power from at least one power source and emit light through at least the polymeric substrate and chromium or chromium-based reflective coating of the first portion, and wherein the at least one light source, when emitting no light in an unlit condition, is concealed within the fluid delivery apparatus lighting module behind at least the polymeric substrate and chromium or chromium-based reflective coating of the first portion;

at least one sensor selected from the group consisting of a wired fluid temperature sensor, a wireless fluid temperature sensor, a wired fluid flow sensor, a wireless fluid flow sensor, a mechanical fluid flow sensor, a mechanical sensor, a wired motion sensor, a wireless motion sensor, and combinations thereof, wherein a printed circuit board assembly (PCBA) is disposed within the fluid delivery apparatus lighting module and electrically-connected to the at least one light source, the PCBA being configured to receive the power from the at least one power source and distribute the received power to at least the at least one light source, with the at least one sensor being in communication with the PCBA for communicating sensed information to the PCBA, wherein the at least one light source is configured to emit the light based on at least the PCBA receiving the sensed information from the at least one sensor.

\* \* \* \* \*